US012234682B2

(12) United States Patent
Noseworthy

(10) Patent No.: US 12,234,682 B2
(45) Date of Patent: Feb. 25, 2025

(54) ENERGY ABSORPTION SOFT-SIDED CORNER ASSEMBLY FOR GATE-OPENING SECTIONS AND GATES OF DASHER BOARD ASSEMBLIES

(71) Applicant: Sport Safe Systems Inc., Burlington (CA)

(72) Inventor: Roger Noseworthy, Burlington (CA)

(73) Assignee: Sport Safe Systems Inc., Burlington (CA)

( * ) Notice: Subject to any disclaimer, the term of this patent is extended or adjusted under 35 U.S.C. 154(b) by 361 days.

(21) Appl. No.: 17/682,290

(22) Filed: Feb. 28, 2022

(65) Prior Publication Data

US 2023/0272665 A1 Aug. 31, 2023

(51) Int. Cl.

*E06B 1/52* (2006.01)
*A63C 19/10* (2006.01)
*E06B 5/00* (2006.01)

(52) U.S. Cl.

CPC ................ *E06B 1/52* (2013.01); *A63C 19/10* (2013.01); *E06B 5/00* (2013.01); *A63C 2203/20* (2013.01)

(58) Field of Classification Search

CPC ........... A63C 19/00; A63C 19/10; E06B 2/52; E06B 5/00; E06B 1/52
USPC ...................................................... 472/92–94
See application file for complete search history.

(56) References Cited

U.S. PATENT DOCUMENTS

2009/0137329 A1* 5/2009 Palumbo ................ A63C 19/10 264/35
2021/0071470 A1* 3/2021 Daut ..................... E06B 7/2316

* cited by examiner

*Primary Examiner* — Kien T Nguyen
(74) *Attorney, Agent, or Firm* — Aird & McBurney LP

(57) ABSTRACT

An energy absorption corner assembly for gate-opening sections and gates of dasher board assemblies for a playing zone having a playing zone comprising: an elongate core section comprising a polymer material having a first durometer; a sheet of the polymer material having a second durometer, wherein the second durometer is greater than the first durometer, wherein the sheet of the polymer material covers an entire surface of the elongate core section(s) facing the playing zone.

24 Claims, 4 Drawing Sheets

ENERGY ABSORPTION SOFT-SIDED CORNER ASSEMBLY FOR GATE-OPENING SECTIONS AND GATES OF DASHER BOARD ASSEMBLIES

FIELD

Aspects of this disclosure relate to dasher boards and accessories for use in bounded sports arenas such as hockey, box lacrosse and soccer.

BACKGROUND

Dasher boards are used in bounded sports arenas to demarcate a general boundary line dividing a playing field from on-looking spectators and to absorb impact from players as they maneuver the outer periphery of the playing field. The dasher boards are typically designed to be secure and stable in order to withstand vibration or shock from player impact. In the player and penalty box areas, dasher boards are designed with gate openings to permit players to enter and exit the playing field. In the design of ice hockey rinks, for example, such dasher boards are designed to withstand significant impacts caused by hockey players being checked into the boards throughout the course of a game. However, the existing design of dasher boards for the player and penalty box areas can possess a significant injury risk situation during play when the player or penalty box gate is opened or accidently become open during play, if the gate latching mechanism is not fully engaged or becomes dislodged. In this situation, if players are checked or fall into the player or penalty box gate-opening section, impact can occur against the exposed narrow and hard frame-side and exposed hard and sharp corner of the dasher board gate-opening sections or gates which can result in serious player injury.

A typical hockey rink has two player boxes, one for each team and a penalty box with separate sections for opposing players. A typical dasher board assembly for the player and penalty box areas of a hockey rink includes lower-framed sections on each side of the player and penalty box gates, which swing inward from the playing surface. Each player box area comprises two lower-framed dasher board gates, one at each end for entering and exiting the playing field during play or at a stoppage of play. The penalty box area also comprises two lower-framed dasher board gates, one for each team that are used for entering during a stoppage of play or exiting either during play or at a stoppage of play. The lower-framed dasher board assemblies on each side of the gates typically have an anchoring system for attaching the lower frame to the rink surface. The dasher boards are typically fabricated in demountable sections of various lengths that are assembled together in an end-to-end fashion to form the boundary. The lower-framed dasher board gates are of similar design to that of the lower-framed dasher boards, except instead of being anchored, have a hinge and latching mechanism to permit inward swinging.

The front-outer surfaces of the lower-framed dasher boards and gates are typically made from hard materials such as high-density polyethylene (HDPE) or fiberglass which are not absorptive. The side and corner of player and penalty box gate-opening sections and gates of dasher board assemblies reveal an exposed narrow and hard frame typically being aluminum, steel or wood and the exposed hard and sharp corner edge of the front-outer surface.

There have been recent design improvements focused on imparting greater flexibility and absorption capabilities of dasher boards in order to dampen the significant impacts that can occur during play. These improvements have focused on increasing the flexibility of the main outer arena sections to allow for displacement of the dasher board in response to an impact by incorporating loose anchors and bolts, spring-mounted systems and aluminum frames. These improvements, however, have not specifically provided any greater flexibility and absorption capabilities for the player and penalty box gate-opening sections or gates of dasher board assemblies when players have impact with open gate sections.

Other approaches features that may include some type of shock absorbing materials as part of the dasher board design, still incorporate a hard puck board facing which could cause player injury due to there still being an exposed hard-sharp corner. Furthermore, the hard puck board covering also reduces the effectiveness of shock absorption capabilities.

Due to the more aggressive playing style and faster speeds associated with contact sports such as hockey that have resulted in serious player injury at arena gate-opening sections, there is an ongoing need in the art for dasher boards specific to the player and penalty box gate-opening sections and gates to have no hard-sharp exposed hard corners and shock absorption features that lessen player impact and injuries and create a safer playing environment.

SUMMARY

In one aspect of the disclosure, there is provided an energy absorption corner assembly for a dasher board assembly for a rink having a playing surface, the energy absorption corner assembly comprising:

- at least one elongate core section comprising a polymer material having a first durometer;
- an outer sheet of the polymer material having a second durometer, wherein the second durometer is greater than the first durometer, wherein the outer sheet of the polymer material covers an entire surface of the at least one elongate core section facing the playing zone.

In another aspect of the disclosure, there is provided a gate-opening section of a dasher board assembly for a playing zone having a playing surface, the gate-opening section comprising an opening defined by two opposed faces of dasher board assembly portions:

- an energy absorption corner assembly comprising:
  - at least one elongate core section comprising a polymer material having a first durometer;
  - an outer sheet of the polymer material having a second durometer, wherein the second durometer is greater than the first durometer, wherein the outer sheet of the polymer material covers an entire surface of the at least one elongate core section facing the playing zone; and wherein the energy absorption corner assembly is secured to the dasher board assembly.

In another aspect of the disclosure, there is provided a gate for an opening of a dasher board assembly surrounding a playing zone, the gate comprising:

- a gate frame assembly with opposed vertical frame jambs, a header, and a threshold, and wherein the gate frame assembly comprises by a plurality of board members affixed thereto;
- at least one energy absorption corner assembly at the opposed vertical frame jambs, wherein at least one energy absorption corner assembly comprises:
  - at least one elongate core section comprising a polymer material having a first durometer;

an outer sheet of the polymer material having a second durometer, wherein the second durometer is greater than the first durometer, wherein the outer sheet of the polymer material covers an entire surface of the at least one elongate core section facing the playing zone.

Advantageously, aspects of this disclosure describe energy absorbing soft-sided corners without any hard puck board facing portion. These energy absorbing soft-sided corners are capable of absorbing shocks from players, and prevents players from impacting with otherwise exposed hard-sharp corners of gate-opening sections and gates of dasher board assemblies. Accordingly, the energy absorbing soft-sided corners eliminate the hard frame-side and exposed hard-sharp corners of the player and penalty box gate-opening sections and gates of dasher board assemblies when gates are open, or become open during play, creating a safer playing environment by lessening the risk of player injuries. The energy absorbing soft-sided corners are specifically designed for player and penalty box areas, and are intended to lessen player injuries by displacing and absorbing impact energy from body checks or falls into the exposed narrow and hard frame-side as well as the exposed hard and sharp corner of lower-frame gate-opening sections and gates when the gates are opened or accidently become open during play, if the gate latching mechanism is not fully engaged or becomes dislodged. The energy absorbing soft-sided corners for gate-opening sections and gates of sport arena dasher board assemblies may be included in an initial installation or be retrofitted.

DETAILED DESCRIPTION

Figure 1:
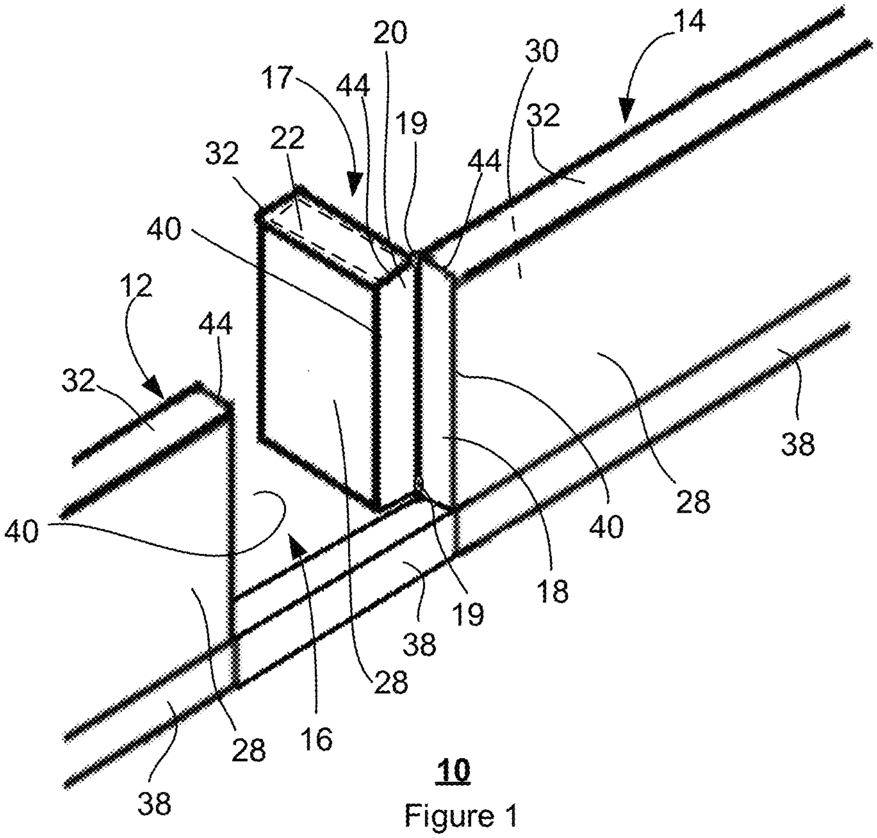
FIG. 1 shows a view of a portion of a dasher board assembly.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 2:
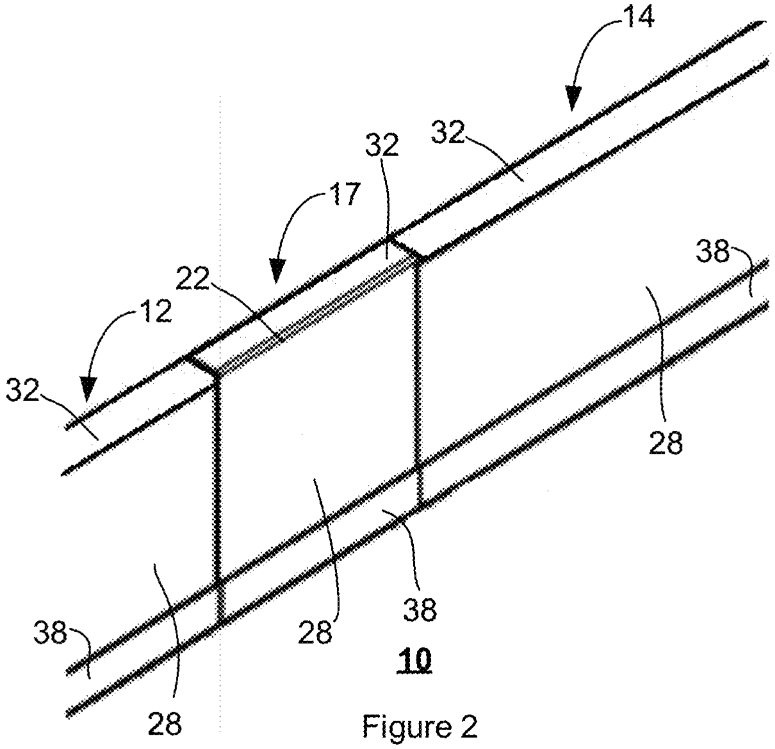
FIG. 2 shows another view of a portion of the dasher board assembly.

Looking at FIGS. 1 and 2, there is shown a view of a portion of a dasher board assembly 10 comprising a first dasher board section 12, a second dasher board section 14, with an opening 16 having a gate 17 to permit ingress to a players' box or penalty box, and egress therefrom. The first dasher board section 12 and the second dasher board section 14 comprise a frame with opposed vertical frame members 18 defining the opening 16 for receiving the gate 17. The gate 17 is hingedly connected to a fixed section of the second dasher board 14 by hinge 19 such that the gate 17 places the opening 16 in an open and closed position. A lower section of the frame of the first dasher board section 12 and the second dasher board section 14 may be anchored to an underlying playing surface of an arena or a rink via an anchoring mechanism in order to secure dasher board assembly 10 in place. The gate 17 comprises a gate frame assembly with side frame pieces or vertical frame jambs 20, and a top frame piece or a header 22, and a threshold 24 between the first dasher board section 12 and the second dasher board section 14.

Rink-facing dasher board panel members 28 and box-facing dasher board panel members 30, top dasher board panel members 32 attached to the frames of the first dasher board section 12 and the second dasher board section 14. The gate frame assembly also includes rink-facing dasher board panel members 28 and box-facing dasher board panel members 30, with top dasher board panel member 32 on header 22, vertical frame jambs 20 . . . . The dasher board panel members 28, 30, and 32 are typically made from hard materials such as high-density polyethylene (HDPE) or fiberglass which are not absorptive. A kick plate 38 may be secured to a lower portion of rink-facing dasher board panel members 28.

Corner 40 is defined where the rink-facing dasher board panel member 28 on the gate 17 meets the inside vertical frame jamb 20, and where the rink-facing dasher board panel member 28 on the first dasher board section 12 and the second dasher board section 14 meets the vertical frame members 18. Corner 44 is defined where top dasher board panel members 32 meet inside vertical frame jambs 20 on gate 17, and the vertical frame members 18 on the first dasher board section 12 and the second dasher board section 14. Corners 40, 44 present hard-sharp edges that may be hazardous to players if they were to collide with the sharp edges.

Figure 3:
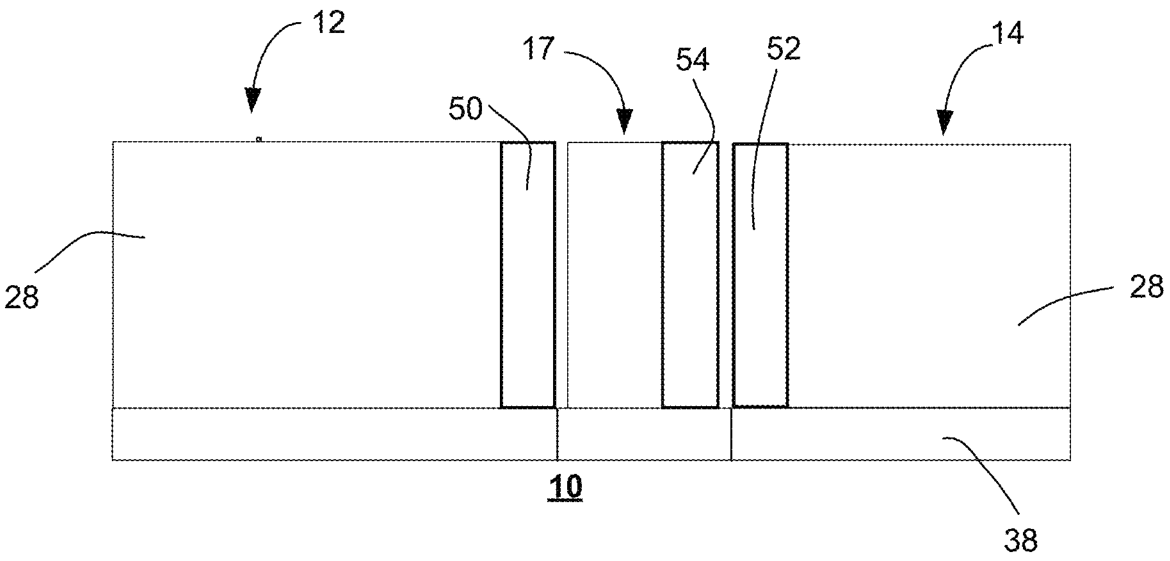
FIG. 3 shows a front perspective view of a gate employing three energy absorption corner assemblies.

FIG. 3 shows a portion of a dasher board assembly 10 with first energy absorption corner assembly 50 formed with first dasher board section 12, second energy absorption corner assembly 52 formed with second dasher board section 14 to which the gate 17 is hingedly connected to, and third energy absorption corner assembly 54 at one end of gate 17 adjacent the hinge 19. Accordingly, the first energy absorption corner assembly 50, second energy absorption corner assembly 52 and third energy absorption corner assembly 54 eliminate the hard-sharp edges present in the first dasher board section 12, second dasher board section 14, gate 17, of the prior art. In one example, the energy absorption corner assemblies 50, 52, 54 are located above the kick plate 38 with a total vertical height to be thirty to forty-eight inches in height depending upon the actual lower-framed dasher board and gate assembly measurements that vary amongst arenas.

Figure 4:
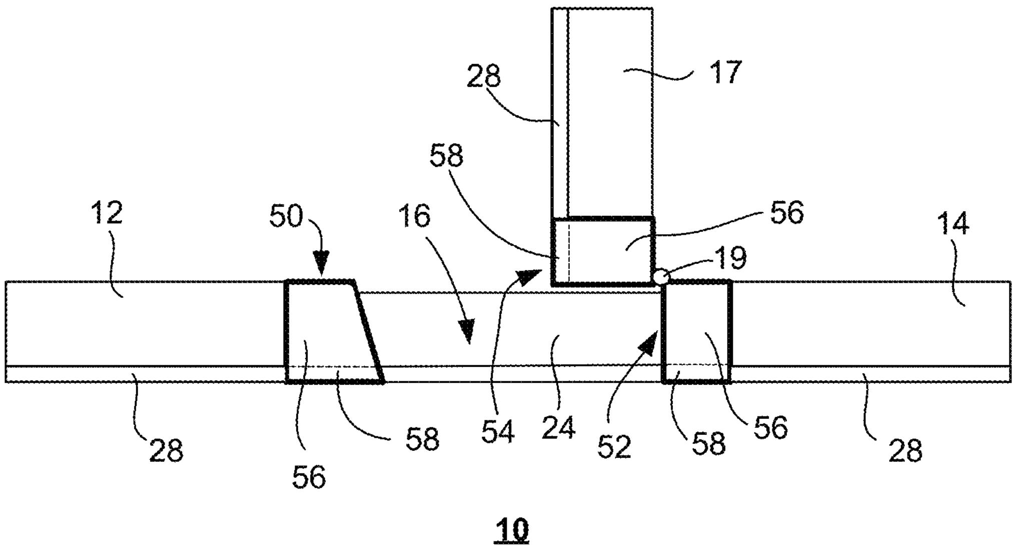
FIG. 4 is a perspective top-view of a dasher board section showing the gate of a player or penalty box in an open position employing three energy absorption corner assemblies.

FIG. 4 is a perspective top-view of a portion of a dasher board assembly 10 showing the gate 17 of a player or penalty box in an open position employing energy absorption corner assemblies 50, 52, 54. The energy absorption corner assemblies 50, 52, 54 comprise an elongate, vertical core section 56 formed from a solid polymer material adapted to displace and absorb the impact energy when a player strikes the side and corner of the first dasher board section 12, the second dasher board section 14, or the gate 17 into the player or penalty box area. In one example, the polymer material of the elongate, vertical core section 56 comprises a hardness of about 25-60 on the Shore 00 scale and about 1-20 on the Shore A scale and is considered to be extra-soft to soft hardness on the hardness scale. In one example, the energy absorbing corner vertical core section 56 has a height between 30 and 48 inches, depending upon the actual height of a new or existing dasher board assembly. In one example, the width of the energy absorbing corner vertical core section 56 ranges between 3 inches to 5.5 inches.

In one example, the energy absorption corner assembly 54 comprises a rink-facing surface with an outer sheet 58 of polymer material with a urethane, Teflon or similar coating of higher durometer than the energy absorbing corner vertical core section 56. Accordingly, as outer sheet 58 abuts the energy absorbing corner vertical core section 56 then any impact energy received on the polymer 58 is absorbed by energy absorbing corner vertical core section 56, thereby reducing the likelihood of injury to a player. In addition, the outer sheet 58 does not alter the game being played since the sheet 58 possesses similar functionality of the HDPE boards 28 as related to the game, for example, in a game of hockey the outer sheet 58 deflects the puck without changing the direction of the puck similar to the HDPE boards 28. In one example, the outer sheet 58 is made from a polymer material with a hardness of about 60-85 on the Shore 00 scale and about 20-55 on the Shore A scale, considered to be of soft to medium-soft hardness on the hardness scale. For comparison to HDPE board material currently used as puck-board, HDPE has a hardness of about 60-70 on the Shore D scale or about 100 on the Shore A scale and is considered to be extra-hard hardness on the hardness scale. In one example, the thickness of the polymer 58 ranges between 0.5 inches to 1 inch.

In one example, the top of the energy absorption corner vertical core section 56 comprises a rounded corner front profile, and may adapted to accommodate any existing soft top sill or bumper in the market.

Figure 5:
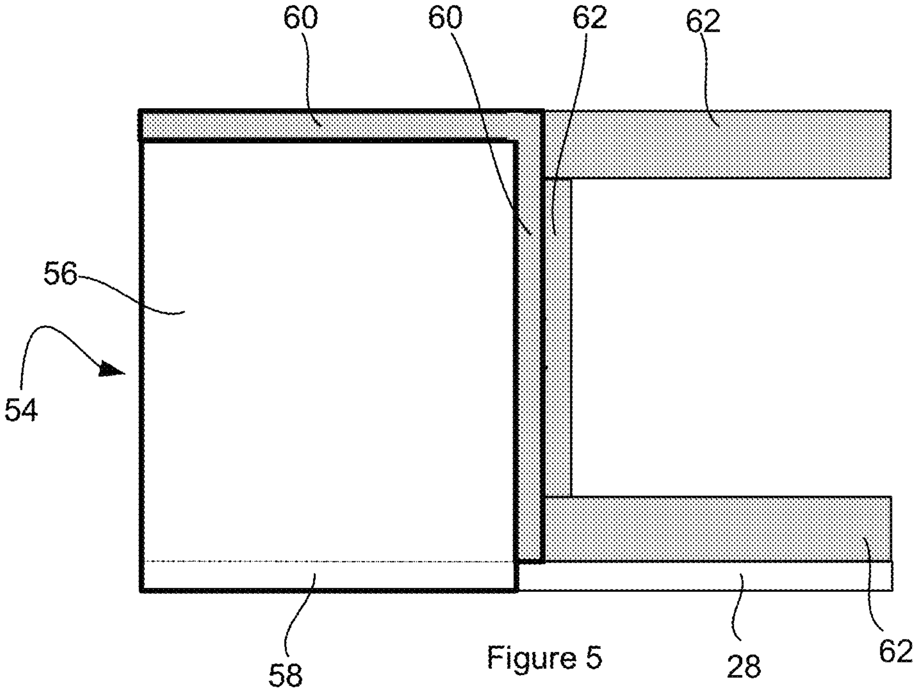
FIG. 5 is a top view showing an attachment of the energy absorption corner to the lower-framed dasher board assembly of the hinged gate-opening section, that is located in the player or penalty boxes.

FIG. 5 is a top view of the energy absorption corner assembly 54 associated with the lower-framed dasher board assembly of the second dasher board section 14 (hinged gate-opening section) located in the player or penalty boxes. The energy absorption corner assembly 52 associated with the gate 17, has a similar view. To incorporate the energy absorption corner assembly 50, 52 or 54 into the first dasher board sections 12 and the second dasher board sections 14 of the player and penalty boxes and gate 17, the opposed vertical frame members 18 of the first dasher board section 12 and the second dasher board section 14, and the vertical frame jambs 20 of gate 17 may be adapted for initial arena installations or retrofitting. For example, the first dasher board sections 12 and the second dasher board sections 14 and gate 17 may be modified to not include a front-corner frame section, thus providing the required spacing to incorporate the energy absorption corner assembly 50, 52, or 54 in its place. In one example, a beam or bracket, such as L-support corner beam 60 is secured to frame 62 the second dasher board section 14 to provide support. The beam 60 may be made of any suitable material capable of the desired support, such as aluminum or steel, and the beam 60 and may be secured to the frame 62 via any suitable means, such as fastener or by welding.

In one example, the support corner beam 60 has a height of between 30 and 48 inches.

In one example, the support corner beam 60 has a thickness of about 0.5 inches.

In one example, the support corner beam 60 may have triangle-shaped inner corner shelf pieces welded to the inside corner for supporting the weight of vertical core sections.

In one example, energy absorption corner assemblies 50, 52, 54 comprise bolt inserts molded into the back and the internal-side of the vertical core section(s) to attach to the aluminum or steel corner L-support beam 60.

Figure 6:
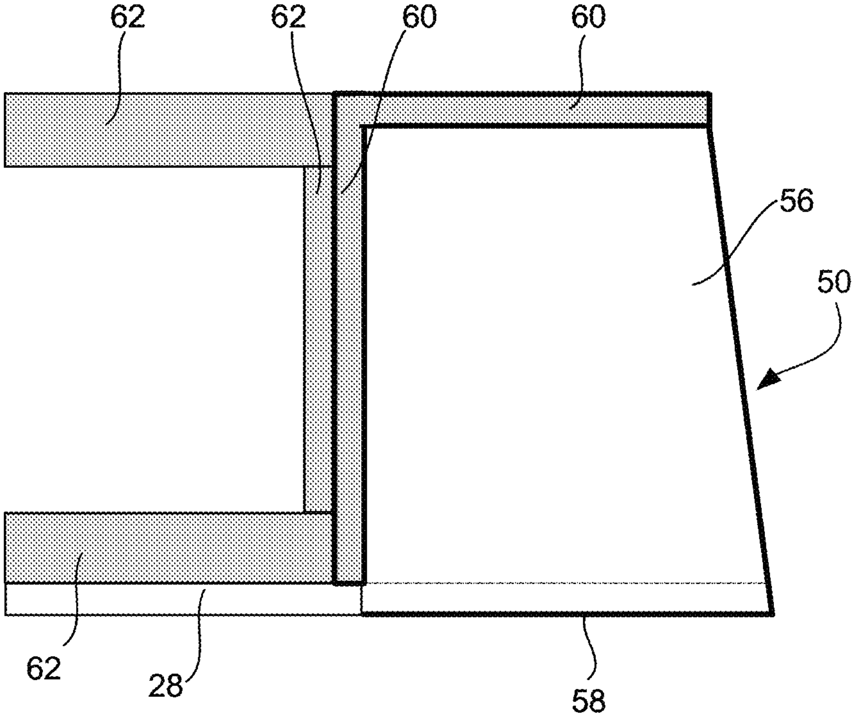
FIG. 6 is a top view showing the attachment of the energy absorption corner to the lower-framed dasher board assembly of the non-hinged (side-beveled angled version) gate-opening section that is in the player or penalty boxes.

FIG. 6 is a top view showing the attachment of the energy absorption corner assembly 50 to the second dasher board section 12 of the non-hinged (side-beveled angled version) gate-opening section that is in the player or penalty boxes. The side-beveled angle design allows for proper gate opening and closing for the energy absorption corner assembly 50 and to eliminate the approximately 1" hard puck board overhang that is the current design for player and penalty box gates, which presents a safety risk.

Figure 7:
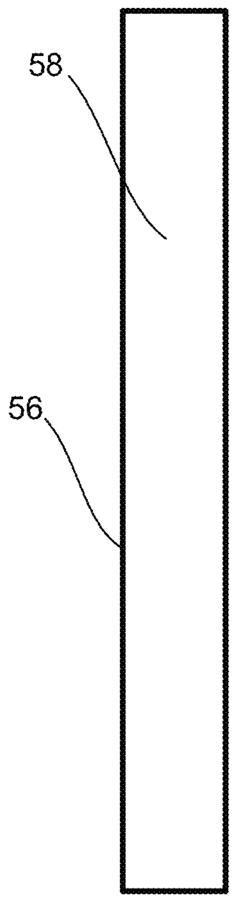
FIG. 7 is a front view of the energy absorption corner assembly, in one example.
Figure 8:
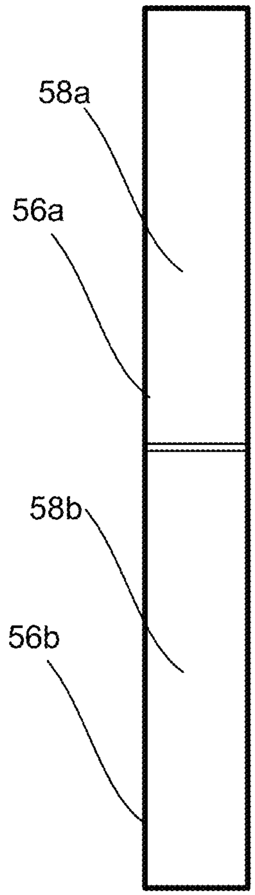
FIG. 8 is a front view of the energy absorption corner assembly, in another example.
Figure 9:
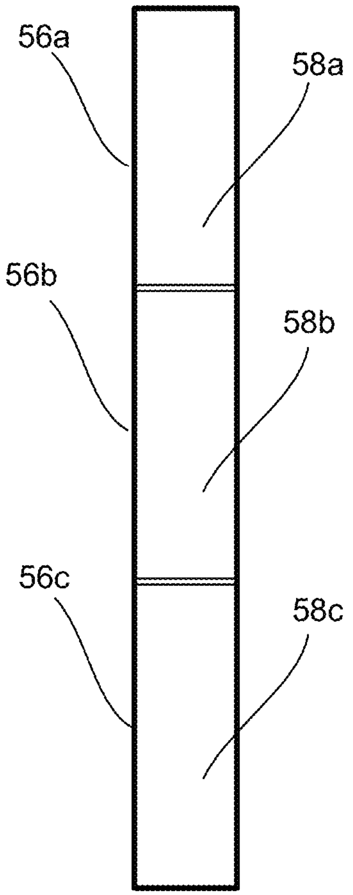
FIG. 9 is a front view of the energy absorption corner assembly, in yet another example.

FIGS. 7-9 are front views of the energy absorption corner assembly 50, 52, or 54 showing the various possible configurations of the vertical core section 56 formed from a solid polymer material with a rink-facing outer surface polymer material 58 with a urethane, Teflon or similar coating of higher durometer, in which the vertical core section 56 and rink-facing outer polymer 58 material may include a plurality of units. The various configurations provide options to adjust for the optimal compression performance of the energy absorption corner assembly 50, 52 or 54. For example, an energy absorption corner assembly comprising one unit 56 and outer sheet 58 may be stiffer than a vertical core section comprising two units **56*a*/58*a* and 56*b*/58*b* or a vertical core section comprising three units 56*a*/58*a*, 56*b*/58*b* and 56*c*/58*c***.

In one implementation, the energy absorption corner assemblies 50, 52, 54 are configured to accommodate any existing soft top sill or bumper in the market.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

The invention claimed is:

1. An energy absorption corner assembly for a dasher board assembly for a rink having a playing surface, the energy absorption corner assembly comprising:

at least one elongate core section comprising a polymer material having a first durometer hardness;

an outer sheet of the polymer material having a second durometer hardness, wherein the second durometer hardness is greater than the first durometer hardness, wherein the outer sheet of the polymer material covers an entire surface of at least one elongate core section facing the playing surface.

2. The energy absorption corner assembly of claim 1, wherein the durometer hardness of the polymer material comprises at least one of a first durometer hardness of about 25-60 on a Shore 00 scale or about 1-20 on a Shore A scale and a second durometer hardness of about 60-85 on the Shore 00 scale or about 20-55 on the Shore A scale.

3. The energy absorption corner assembly of claim 2, wherein the elongate core section is made from a single unit of the same durometer hardness.

4. The energy absorption corner assembly of claim 2, wherein the outer sheet is made from a single unit of the same durometer hardness.

5. The energy absorption corner assembly of claim 2, wherein the elongate core section and outer sheet may comprise a plurality of units.

6. The energy absorption corner assembly of claim 5, wherein the elongate core section and outer sheet extends from a kick plate to a top of the dasher board assembly, with a height between 30 to 48 inches, depending upon the height of a new or existing dasher board assembly.

7. The energy absorption corner assembly of claim 1, wherein the width of the elongate core section and outer sheet ranges from about 3 inches to about 6 inches in total.

8. The energy absorption corner assembly of claim 1, wherein the combined thickness of the elongate core section and outer sheet ranges from about 3 inches to about 6 inches in total, depending upon the depth of a new or existing dasher board assembly.

9. The energy absorption corner assembly of claim 1, wherein a top playing zone-facing edge of the outer sheet comprises a rounded corner profile.

10. The energy absorption corner assembly of claim 1, wherein opposed frame members of a gate-opening section of the dasher board assembly comprise a first energy absorption corner assembly and a second energy absorption corner assembly; wherein the gate-opening section comprises opposed vertical gate jambs with the second energy absorption corner assembly comprise a third energy absorption corner assembly.

11. The energy absorption corner assembly of claim 1, wherein a portion of the elongate core section is secured to a support corner beam for attaching to one of the opposed frame members of a gate-opening section of the dasher board assembly dasher board and for attaching to the gate.

12. The energy absorption corner assembly of claim 11, wherein the support beam has a length between 30 inches and 48 inches, wherein the support bracket is provided for structural support.

13. The energy absorption corner assembly of claim 11, wherein the support beam has a thickness of about 0.5 inches.

14. The energy absorption corner assembly of claim 11, wherein the support beam has triangle-shaped inner corner shelf pieces welded to the inside corner for supporting the weight of vertical core sections.

15. A gate-opening section of a dasher board assembly for a rink having a playing surface, the gate-opening section comprising an opening defined by two opposed sides of dasher board assembly portions:

an energy absorption corner assembly comprising:

at least one elongate core section comprising a polymer material having a first durometer hardness;

an outer sheet of the polymer material having a second durometer hardness, wherein the second durometer hardness is greater than the first durometer hardness, wherein the outer sheet of the polymer material covers an entire surface at least one elongate core section facing the playing surface; and wherein the energy absorption corner assembly is secured to the dasher board assembly.

16. The gate-opening section of claim 15, wherein the durometer hardness of the polymer material comprises at least one of a first durometer hardness of at least one of about 25-60 on a Shore 00 scale or about 1-20 on a Shore A scale and a second durometer hardness of about 60-85 on the Shore 00 scale or about 20-55 on the Shore A scale.

17. The gate-opening section of claim 16, wherein the outer sheet is made from a single unit of the same durometer hardness.

18. The gate-opening section of claim 15, wherein the elongate core section is made from a single unit of the same durometer hardness.

19. The gate-opening section of claim 15, wherein the elongate core section and outer sheet may comprise a plurality of units.

20. A gate for an opening of a dasher board assembly surrounding a playing zone, the gate comprising:

a gate frame assembly with opposed vertical frame jambs, a header, and a threshold, and wherein the gate frame assembly comprises by a plurality of board members affixed thereto;

at least one energy absorption corner assembly at the opposed vertical frame jambs, wherein at least one energy absorption corner assembly comprises:

at least one elongate core section comprising a polymer material having a first durometer hardness;

an outer sheet of the polymer material having a second durometer hardness, wherein the second durometer hardness is greater than the first durometer hardness, wherein the outer sheet of the polymer material covers an entire surface of the at least one elongate core section facing the playing surface.

21. The gate-opening section of claim 20, wherein the durometer hardness of the polymer material comprises at least one of a first durometer hardness of at least one of about 25-60 on a Shore 00 scale or about 1-20 on a Shore A scale, and a second durometer hardness of about 60-85 on the Shore 00 scale or about 20-55 on the Shore A scale.

22. The gate-opening section of claim 21, wherein the elongate core section is made from a single unit of the same durometer hardness.

23. The gate-opening section of claim 22, wherein the outer sheet is made from a single unit of the same durometer hardness.

24. The gate-opening section of claim 22, wherein the elongate core section and outer sheet may comprise a plurality of units.

* * * * *